United States Patent [19]

Yamashita et al.

[11] Patent Number: 4,840,401
[45] Date of Patent: Jun. 20, 1989

[54] GUIDE RAIL COVER

[75] Inventors: Tatsuo Yamashita; Kazuyoshi Ishiguro, both of Aichi, Japan

[73] Assignee: Kabushiki Kaisha Tokai-Rika-Denki-Seisakuso, Niwa, Japan

[21] Appl. No.: 221,617

[22] Filed: Jul. 19, 1988

[30] Foreign Application Priority Data

Jul. 21, 1987 [JP] Japan .......................... 62-111620[U]
Aug. 21, 1987 [JP] Japan .......................... 62-127143[U]

[51] Int. Cl.$^4$ ............................................ B60R 21/02
[52] U.S. Cl. ..................................................... 280/804
[58] Field of Search ......................................... 280/804

[56] References Cited

U.S. PATENT DOCUMENTS 4,618,164 10/1986 Ryu ...................................... 280/804
4,708,367 11/1987 Yoshitsugu ........................... 280/804

FOREIGN PATENT DOCUMENTS 251257 11/1987 Japan .................................. 280/804

Primary Examiner—Kenneth R. Rice
Attorney, Agent, or Firm—Sixbey, Friedman, Leedom & Ferguson

[57] ABSTRACT

A guide rail cover disposed over a guide rail which guides a slider which secured one end of a webbing, in forward and backward direction of a vehicle. The guide rail cover has a base which is made of a rigid synthetic resin and also is mounted on the guide rail, and a filler which is made of a nonrigid synthetic resin and also extends from the base to close a guide groove which guide the guide rail. Therefore, the base has a high rigidity and inhibits its portions facing the slider from lifting off the guide rail.

19 Claims, 14 Drawing Sheets

FIG. IA
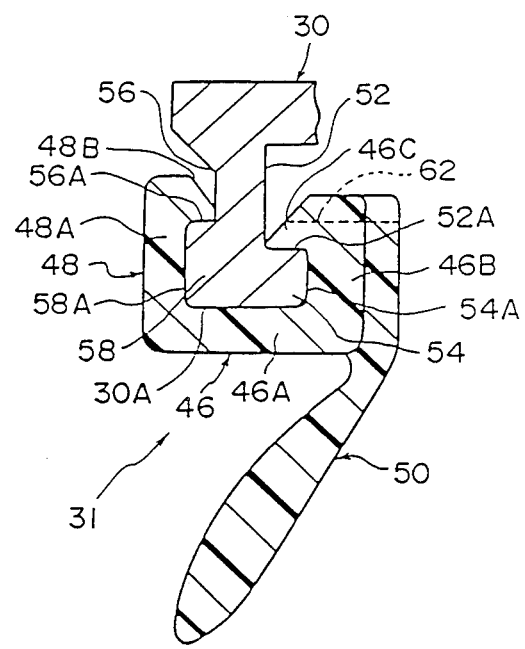

FIG. 5
FIG. 6
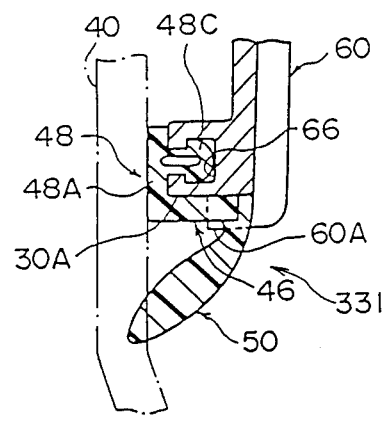
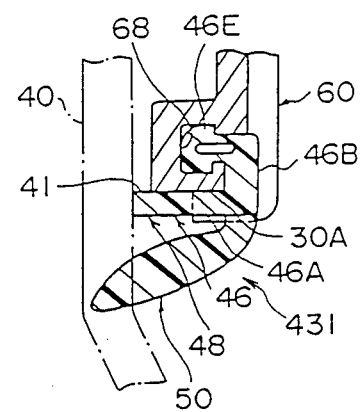

PROIR ART

PROIR ART

PROIR ART

GUIDE RAIL COVER

BACKGROUND OF THE INVENTION

The present invention relates to a guide rail cover for use in an automotive automatic seat belt system. More particularly, the invention is concerned with a guide rail cover which covers a guide rail for guiding, in the longitudinal direction of a vehicle, a slider which is slidably received in the guide rail and which retains one end of a webbing for constraining a seat occupant.

This sort of a guide rail cover is made from a resilient material and has, as shown in FIGS. 14 and 18, a solid structure comprising a base 12 provided with a pawl 12. An engaging with a guide rail 10 and a filler 14 integrally connected to a base 12. A pair of such guide rail covers is arranged to oppose each other with a lower opening 16 formed in a guide rail 10 in between, and, as indicated in a solid line in FIG. 7, two fillers abut against each other, in such a manner as to cover a lower opening 16.

As shown by imaginary lines in FIG. 14, the fillers 14 are resiliently deformed at their portions contacted by a slider 18 which moves along the guide rail 10, thereby allowing the slider 18 to move.

Guide rail covers are conventionally made from a resilient resin, etc., because if the filler 14 is not sufficiently resilient, it would impose some movement resistance on the slider 18 and, moreover, the portion that corresponds to the slider 18 would in turn cause the tops of both to fail to abut each other in front and rear of the slider 18 over a long distance, exposing the lower opening 16.

Thus, the guide rail cover, at its portion that corresponds to the slider 18, allows the filler 14 to be bent and deformed. In addition, the base 12 is lifted off the guiderail, with the result that the appearance is degraded.

Also, as shown in FIG. 15, since the guide rail 10 has a plurality of its portions mounted, through retainers 20, to a side rail 22 and a front pillar (not shown), etc. at the upper part of the side wall of a vehicle, notches 24 must be formed in the guide rail cover as shown in in FIG. 16 in order to permit the retainers 20 to pass therethrough.

Therefore, the guide rail cover does not engage with the guide rail 22 at portions where the notches 24 are formed, when the slider 18 pass through this portion, therefore, the filler 14 largely expands as shown in FIG. 14, which in turn lifts the base 12 off the guide rail at the periphery of the notch 24. This also degrades the appearance.

Also, in the above mentioned slider 18, a shoe made from a resin, etc. is disposed to abut against the inner wall of guide rail 10 in order to smooth the movement of the slider 18 and also to avoid any noise generated when the slider 18 slides on the inner wall of the guide rail, while securing durability.

For these reasons, such a work process is essential as to attach a shoe to the slider 18, so that the slider 18 must be thick enough to some extent in order to ensure durability.

SUMMARY OF THE INVENTION

Accordingly, an object of the present invention is to provide such a guide rail cover that a base which engages a guide rail would not lift off the guide rail at the portion which corresponds to a slider and that shortens the time required for mounting necessary components on the guide rail.

According to the invention, there is provided a guide rail cover disposed over a guide rail provided with guide grooves which guide, forward and backward of a vehicle, a slider to which one end of a webbing for an occupant of the vehicle is engaged, comprising a base made from a rigid resin which is engaged with the guide rail and a filler which is made from a resilient resin softer than the rigid resin and extends out of the base in such a direction as to close the guide grooves.

In the above-mentioned structure according to the present invention, the base has a high rigidity because it is made from a rigid resin, so that the portion of the base which supports a filler which comes in sliding contact with a slider would not lift off the guide rail. The filler, likely with conventional ones, are resilient and therefore would not have its capabilities impaired whatsoever.

As an example, the guide rail cover may further comprise a shoe which is made from a rigid resin and also extends out continually of the base in sliding contact with the slider.

Furthermore, since the shoe is so formed as to project from the base, the process to assemble the shoe independently can be omitted, so that the time required to mount necessary components on the guide rail is shortened. Since the guide rail cover has the rigid base and also the shoe made from a rigid resin is integrally attached thereto, the cover exhibits a high rigidity and therefore is easy to handle, contributing also to shortening of the assembly time.

BRIEF DESCRIPTION OF DRAWINGS

FIG. 1A is an enlarged fragmentary sectional view of the embodiment shown in FIG. 1;

FIGS. 3 to 6 are longitudinal sectional views illustrating the important portions of second to fifth embodiments according to the present invention respectively, as corresponded to FIG. 1;

DESCRIPTION OF THE PREFERRED EMBODIMENTS

Figure 2:
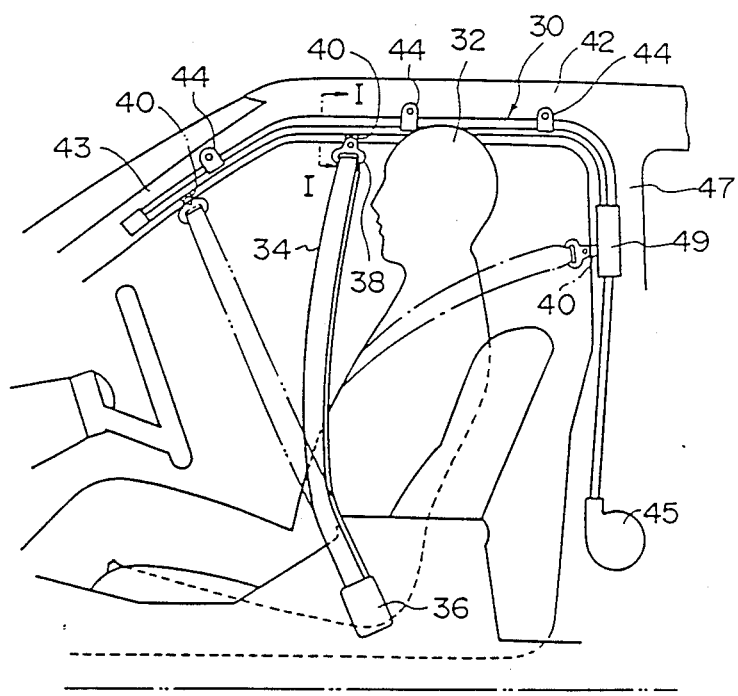
FIG. 2 is a schematic illustration of an automatic seat belt device provided with a guide rail over which a guide rail cover of the first embodiment is disposed.

FIG. 2 shows a guide rail 30 over which a guide rail cover embodying the present invention is disposed. In an automatic seat belt provided with the guide rail 30, the lower end of a webbing 34 which constrains an occupant 32 is rolled up to a roller 36 which is fixed to the a vehicle-body floor at the center in the breadthwise direction of the vehicle. The upper end of the webbing 34 engages with an anchor metal-fitting 38 which is pivotally supported by a slider 40. The slider 40 has its upper portion fitted to the hollow portion of the guide rail 30 in sliding contact therewith.

The guide rail 30 is mounted on a roof side rail 42 and a front pillar 43 on the upper portion of the vehicle's side wall through two retainers 44 and also mounted on a center pillar 47 through an anchor metal-fitting 49, so that the slider 40 can be guided forward and backward within the vehicle compartment. The slider 40 is connected through flexible tape, cables, or the like (not shown), to a driver 45, so that it can drive the slider 40 along the guide rail 30 forward and backward within the vehicle compartment.

Referring to FIG. 2, two-dot-and-dash lines show the slider 40 in the forward limit position. When the slider 40 is in this position, the occupant 32 is not constrained by the webbing 34. In contrast, when the slider 40 is in a rearward limit position shown by one-dot-and-dash line, the occupant is constrained by the webbing.

Figure 1:
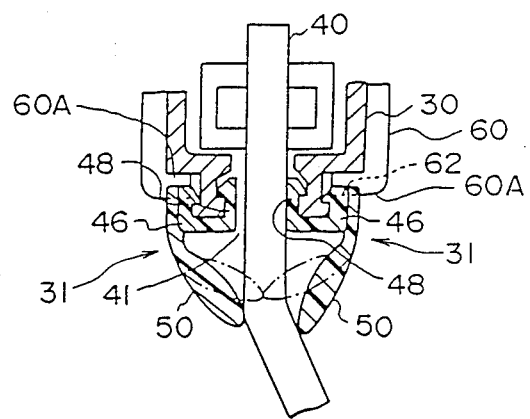
FIG. 1, corresponding to the view I—I in FIG. 2, is a longitudinal sectional view illustrating a first embodiment of a guide rail cover related to the present invention.

As shown in FIG. 1, a pair of the guide rail cover 31 of this embodiment extend over the entire length of the guide rails 30 such as to oppose each other along an opening 41 in the lower end of the guide rail 30 where the lower end of the slider 40 projects out. The guide rail cover 31 is of a construction that a base 46, a shoe 48, and a filler 50 are molded from a resin into an integral structure by extrusion or the like.

As shown in FIG. 1A in detail, the base 46 is provided with a lateral wall 46A, a vertical wall 46B whose lower end is continuously connected to the end of the outer side (i.e., away from the axis of the guide rail in a vertical direction) of the lateral wall 46A, and a suspended wall 46C which is continuously connected to the upper end of the vertical wall 46B. The shoe 48 is provided with a vertical wall 48A whose lower end is continuously connected to the end of the inner side (i.e., toward the axis of the guide rail in a vertical direction) of the lateral wall 46A of the base 46, and a suspended wall 48B which is continuously connected to the upper end of the vertical wall 48A. The base 46 and the shoe 48 are both made from a rigid resin. The filler 50, with its upper end connected to the outer side (i.e., away from the axis of the guide rail in a vertical direction), goes downward and extends toward the inner side (i.e., toward the axis of the guide rail in a vertical direction). The filler 50 is made from a resilient resin.

The base 46 has its suspended wall 46C abutting against a lower part wall surface 52A of an outer side recess 52 formed in the side wall surface of the lower end of the guide rail 30 and also does it have its lateral wall 46A abutting against the lower end wall surface 30A of the guide rail 30, so that an outward projection 54 which is so formed at the lower end of the guide rail 30 as to project laterally can be sandwiched, with the lower part wall surface 52A as an upper part wall surface.

Also, the base 46 has the vertical wall 48A of the shoe 48 abutting against a vertical wall surface 58A of an inner projection 58 so formed at the lower end of the guide rail 30 as to project laterally, so that the lower end of the guide rail 30 can be sandwiched between a lower part wall surface 56A of an inner side recess 56 formed in the inner side wall surface of the lower end of the guide rail 30 as an upper part wall surface and the vertical wall 46B of the base 46 which abuts against the vertical wall surface of the above-mentioned outward projection 54.

Also, the base 46 has the suspended wall 48B of the shoe 48 abutting against the lower part wall surface 56A of the inner recess 56, so that it can sandwich the inner projection 58 between itself and the lateral wall 46A of the base 46 abutting against the lower part wall surface 30A of the guide rail 30.

According to this arrangement, since the suspended walls 46C and 48B at both ends are engaged respectively with the lower part wall surfaces 52A and 56A with the intermediate portion of the the shoe 48 and the base 46 having a high rigidity because of its hardness in the guide rail cover 31 according to this embodiment abutting against the lower end of the guide rail 30 over a large area, the covers are securely mounted to the guide rail 30.

As indicated by one-dot-and-dash line in FIG. 1, a pair of the fillers 50 have their tips pressing and abutting each other at such a portion that they do not face the slider 40, thus closing the lower opening 41 of the guide rail 30.

At a portion which faces a lower part bend 60A of the retainer 60 in the upper end surfaces of both the above-mentioned base 46 and filler 50, a notch 62 is formed into which the lower part bend 60A fits.

In the case of the guide rail cover 31 according to this embodiment constructed as mentioned before, the above-mentioned mounting state can be easily attained by pressing the lower end of the guide rail 30 face-to-face into a recess formed by the surrounding base 46 and shoe 48.

Along the guide rail 30 over which the guide rail cover 31 is so disposed as described before, the slider 40 so driven as mentioned before is guided. Since the slider 40 is fitted to the guide rail 30 with some backlash in the direction of width of the vehicle-compartment (i.e., lateral direction in FIG. 1), the slider 40 is drawn toward the inside of the vehicle width direction (i.e., rightward in FIG. 1) by the actuating force of the roller 36, so that it generally moves in such a way that it presses and abuts against the shoe 48 of the guide rail cover placed on the inside in the vehicle-compartment width direction. Therefore, the slider 40 smoothly moves as sliding along the shoe 48 and does not directly abut the guide rail 30, thus avoiding metallic sliding contact noise. Also, even if the slider 40 swings toward the outside in the widthwise direction of the vehicle-compartment, it abuts against the shoe 48 of the guide rail cover 31 placed to the outside in the vehicle-compartment width direction, thus avoiding sliding noise similarly.

As indicated by a solid line in FIG. 1, the slider 40 moves as pushing through between a pair of fillers 50 which cover the lower part opening 41 of the guide rail 30. Since the fillers 50 are soft, it can easily be deformed resiliently by the slider 40, without imposing any substantial resistance on the movement of the slider 40.

In addition, since the base 46 is hard and has a high rigidity, it does not lift off the guide rail 30 even when the slider passes. Particularly in this embodiment, the vertical wall 48A of the hard shoe 48 acts to inhibit the base 46 from lifting off the guide rail 30, the lift-off can be securely avoided despite the existance of the notch 62.

Immediately after the passage of the slider 40, the fillers 50 separated are brought together to cover the lower part opening 41 by a shape recovering force as indicated by a one-dot-and-dash line. Since the fillers 50 are soft and have a low rigidity and, therefore, do not have any substantial propagation of deformation, it is possible to minimize the portion of the lower part opening 41 not covered by the fillers 50.

A description will be given hereinunder as to other embodiments in which the guide rail covers are integrally molded from a resin.

Figure 3:
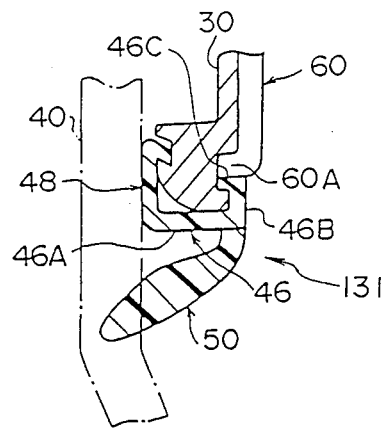

FIG. 3 shows a second embodiment according to the present invention. In this embodiment, although the hard base 46 and the shoe 48 are both engaged to the guide rail 30 in almost the same relationship as in the first embodiment, the guide rail cover 131 has no notch formed therein for the passage of the retainer 60, so that the lower part bend 60A of the retainer 60 abuts against the upper surface of the pawl wall 46C of the base 46. Moreover, the soft fillers 50 have their upper ends connected to both of the lateral wall 46A and the vertical wall 46B of the base 46 and extend downward in the same manner as with the first embodiment mentioned before.

Figure 4:
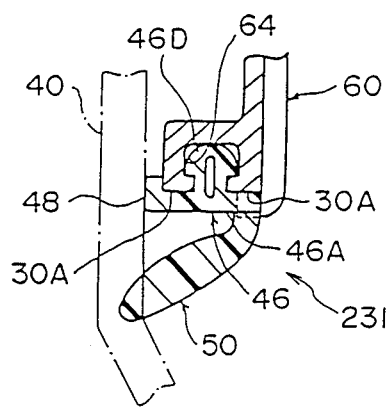

In this embodiment also, the base 46 does not lift off anywhere over the entire length in the same manner as the first embodiment described before FIG. 4 shows a guide rail cover 231 of a third embodiment according to the present invention. In this embodiment, the hard base 46 comprises a lateral wall 46A and a pawl wall 46D that is transformed into a semicircle because of its upper end whose width is enlarged and that upward projects of the middle of the lateral wall 46A; the pawl wall 46D has in it a hollow and thererfore can largelly be deformed resiliently when the guide rail cover 231 is mounted. The lateral wall 46A abuts against a lower end wall surface 30A of the guide rail 30, while the pawl wall 46D is fitted to and engaged by a narrow-mouth recess 64 which has an opening to the lower end wall surface 30A of the guide rail 30. The shoe 48 has its lower end upward extending continuously at the inner end of the lateral wall 46A of the base 46, abutting against the inner wall surface of the guide rail 30. The soft filler 50 has its upper end continuously extending downward from the lower surface of the outer end of the lateral wall 46A of the base 46 in the same manner as with the first embodiment mentioned earlier.

In this embodiment also, the base 46 is hard, which inhibits itself from lifting off and also acts to cause both the pawl wall 46D and the hard shoe 48 to inhibit the base 46 from lifting off, so that lift-off can be securely avoided.

FIG. 5 shows a guide rail cover 331 of a fourth embodiment according to the present invention. In this embodiment, the hard shoe 48 comprises the vertical wall 48A and a pawl wall 48C that is transformed into a semicircle because of its upper end whose width is enlarged and that laterally projects of the middle of a vertical wall 48A; the pawl wall 48C has in it a hollow and therefore can largelly be deformed when the guide rail cover 331 is mounted. The vertical wall 48A abuts against the inner wall surface of the guide rail 30, while the pawl wall 48C is fitted to and engaged by a narrow-mouth recess 66 which has an opening to the inner wall surface of the guide rail 30. The base 46 has its inner end continuing at the lower end of the vertical wall 48A of the shoe 48, abutting against the lower end wall surface of the guide rail 30. A resilient filler 50 has its upper end continuing from the side surface over to the lower surface of the outer wall end of the base 46, downward extending in the same manner as with the first embodiment mentioned earlier.

In this embodiment also, the base 46 is hard, which inhibits itself from lifting off, and also both the pawl wall 48C and the vertical wall 48A of the hard shoe 48 act to inhibit the base 46 from lifting off, so that lift-off can securely be avoided.

FIG. 6 shows a guide rail cover 431 of a fifth embodiment according to the present invention. In this embodiment, the hard base 46 comprises the lateral wall 46A and a pawl wall 46E which laterally projects at the upper end of the vertical wall 46B and is transformed into a semicircle because of its upper end whose width is enlarged; the pawl wall 46E has in it a hollow and therefore can be deformed largelly and resliently when the guide rail cover 431 is mounted. The lateral wall 46A abuts against the lower end wall surface 30A of the guide rail 30, while the pawl wall 46E is fitted to and engaged by a narrow-mouth recess which has an opening to the outer wall surface of the guide rail 30.

The shoe 48 straightly continues to the inner end of the base 46, projecting below the lower part opening 41 of the guide rail 30. The soft filler 50 has its upper end continuing to the lower surface of the lateral wall 46A of the base 46, downward extending in the same manner as with the first embodiment mentioned earlier.

In this embodiment also, the base 46 is hard, which inhibits itself from lifting off, and also the pawl wall 46E of the base 46 acts to inhibit the base 46 from lifting off, so that lift-off can securely be avoided.

Figure 7:
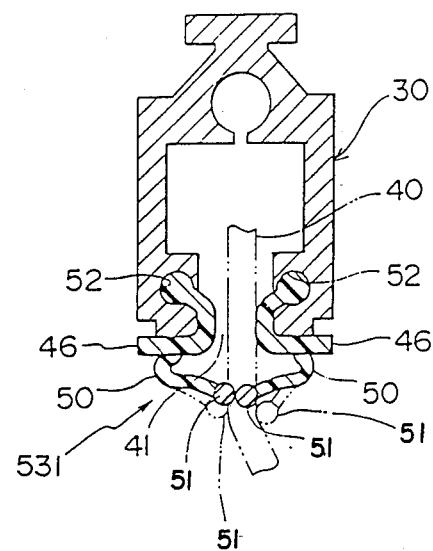
FIG. 7 is a longitudinal sectional view illustrating a sixth embodiment of the guide rail cover.

A sixth embodiment will be described hereinunder. As shown in FIG. 7, a pair of guide rail covers 531 of this embodiment extends over the entire length of the guide rails 30 so as to oppose each other across the lower opening 41 of the guide rail 30 through which the lower end of the slider 40 projects. The guide rail cover comprises the base 46, the filler 50, and an abutting portion 51 which are all molded integrally from a resin by extrusion.

Figure 7A:
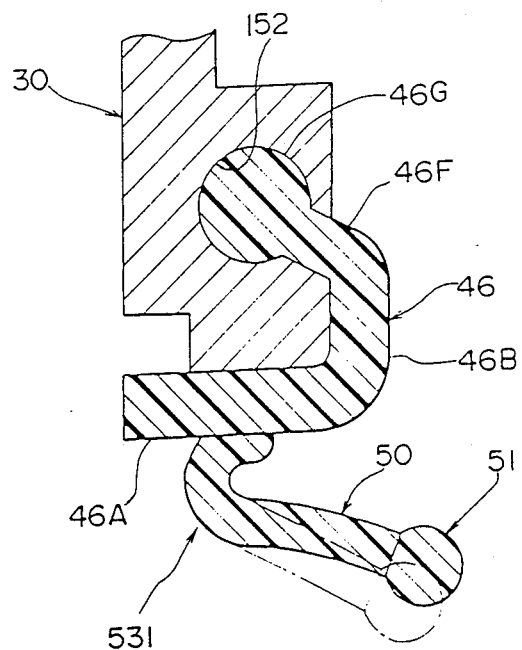
FIG. 7A is an enlarged fragmentary sectional view of the embodiment shown in FIG. 7.

As shown in FIG. 7A in detail, the base 46 is provided with the lateral wall 46A, the vertical wall 46B which bends at a right angle with respect to the inner end of the lateral wall 46A then extends upward, an oblique wall 46F which externally bends from the upper end of the vertical wall 46B and upward extends obliquely, and an engaging portion 46G of a circular cross section which continues to the upper end of the oblique wall 46C. The base 46 is to be hard.

A filler 50 continues from its upper end to the intermediate lateral portion of the lateral wall 46A of the base 46 and once extends over to the outside and then largely bends downward, extending over toward the inside. The filler 50 is resilient.

The abutting portion 51 is of a circular cross section and continues to the lower end of the filler 50. The abutting portion 51 is hard.

The above-mentioned base 46 has both the oblique portion 46F and the engaging portion 46G fitted into a recess 152 formed in the inner wall surface of the lower end of the guide rail 30; moreover, the engaging portion 46G is fitted into a circular cross-sectional portion formed in the inner part of the recess 152. Also, the vertical wall 46B presses and abuts against the inner wall surface of the lower end of the guide rail 30, while the lateral wall 46A presses and abuts against the lower end surface of the guide rail 30.

Accordingly, the base 46 tightly sticks to the guide rail 30 in such a state that the engaging portion 46G is inhibited from slipping off the recess 152 and, because of its high rigidity, is kept in this state, i.e. continues to be tightly attached to the guide rail 30.

As indicated by a solid line in FIG. 7, a pair of fillers 50 has its portions which do not face the slider 40 mutually pressing and abutting against at the upper ends of both, so as to cover the lower part opening 41 of the guide rail 30.

In the case of the guide rail cover 531 of this embodiment as constructed above, the engaging portion 46G of the base 46 is inserted from one end of the guide rail 30 into the recess 152 and then drawn up to the other end of the guide rail 30, so that it is mounted to the guide rail 30. This process of mounting can be completed in a short time because the base 46 is rigid and therefore easy to handle.

Also, since the guide rail cover 531 of this embodiment is molded by extrusion, when this cover has been mounted over the guide rail 30, no waviness nor fold occur even at the filler 50 because the abutting portion 51 is rigid, although a large compressive stress occurs longitudinally in the priphery of coupling of the roof side rail 42 and the front pillar 43 and also the priphery of coupling of the roof side rail 42 and the center pillar 47.

As mentioned above, to the guide rail 30 over which the guide rail cover is disposed, the slider 40 driven as mentioned earlier is guided. Since the slider 40 is fitted into the guide rail 30 with some backlash in the vehicle-compartment width direction (i.e., lateral direction as shown in FIG. 7), it is drawn toward the inner side in the vehicle-compartment width direction (i.e., rightward in FIG. 7) until it presses and abuts against the vertical wall 46B of the guide rail cover generally placed on the inner side in the vehicle-compartment width, and in this state it moves. Since, therefore, the slider 40 smoothly moves in sliding contact with the vertical wall 46B and does not directly abut against the guide rail 30, no metallic sliding noise is generated. Also, even when the slider has been swung to the outer side in the vehicle-compartment width direction, it would abuts against the vertical wall 46B of the guide rail cover placed on the outer side in the vehicle-compartment width direction, so that no sliding noise is generated silimarly.

The slider 40 moves pushing through the pair of abutting portions 51 and the filler 50 which cover the lower opening 41 of the guide rail, as indicated by a one-dot-and-dash line in FIG. 7. At the same time, since the filler 50 is soft although the abutting portions 51 are hard, the filler 50 can easily be deformed resiliently, so that no large resistance is imposed on the movement of the slider 40. Moreover, since the abutting portions 51 are hard, the abutting area between them and the slider 40 is reduced, which in turn decreases an abrasive resistance of the slider 40.

Also, since the base 46 is hard and has a high regidity, it does not lift off the guide rail 30 even when the slider 40 passes therethrough.

Both the pair of abutting portions 51 and the filler 50 thus pushed through cover the lower opening 41 by their shape recovering force, as indicated by a solid line in FIG. 1, immediately after the slider 40 passes.

According to this embodiment, since the pair of abutting portions 51 are of a circular cross section, they do not have so large an area in contact with the slider 40 and therefore receives a smaller resistance while that slider is moving.

As described above, in the case of the guide rail cover 531 related to this embodiment, the base which captivates the guide rail does not lift off it at a portion where the base faces the slider; moreover, a time required to mount that guide rail cover over the guide rail can be reduced and also the occurrence of waviness and fold can be avoided in the periphery of the bend.

Figure 9:
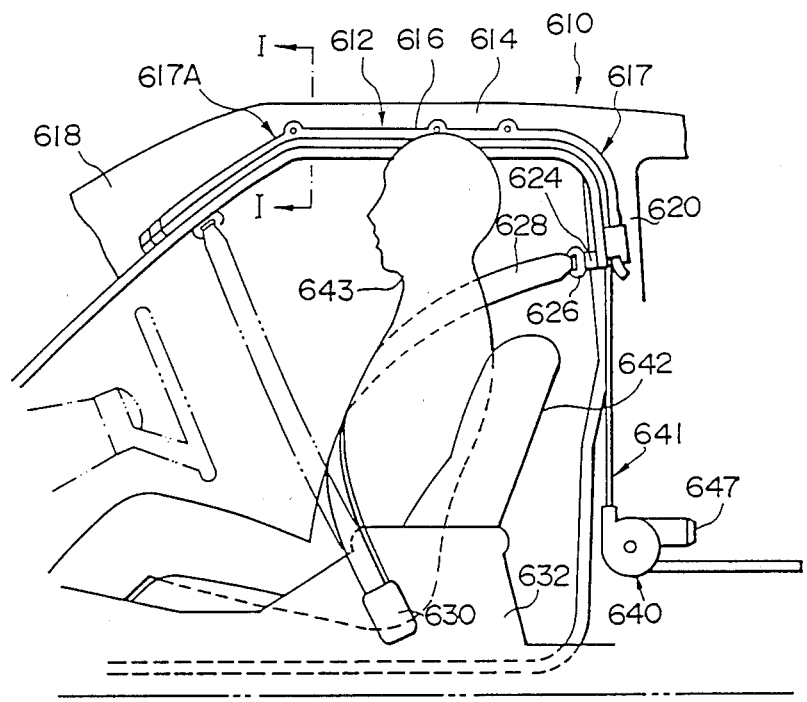
FIG. 9 is an elevation, as viewed from the side of a vehicle, illustrating automatic seat belt device to which the guide rail cover of the seventh embodiment is applied.

FIG. 9 shows a side view of an automatic seat belt device 610 to which the nineth embodiment has been applied.

Onto a roof side member 614 of a vehicle 612 to which this automatic seat belt device 610 is employed, a guide rail 616 is mounted. The upper end of this guide rail 616 extends, via a bend 617, along a front pillar 618 of the vehicle 612 and, while the other end of it on the rear side of the vehicle bends at a substantially right angle at the bend 617 then extends over along a center pillar 620.

Figure 8:
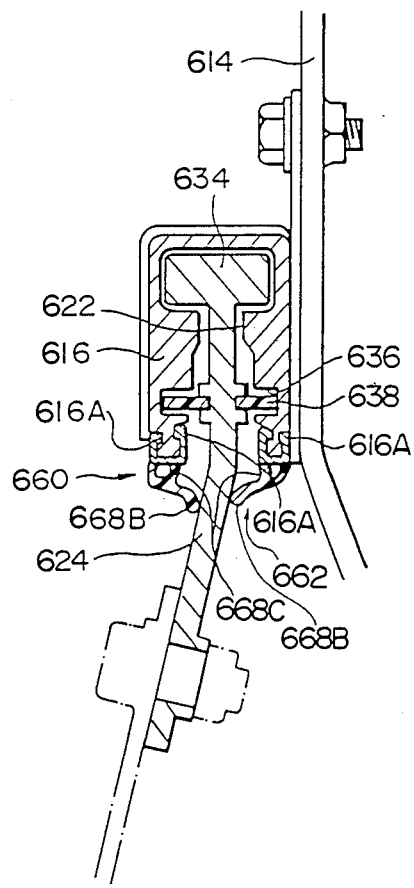
FIG. 8 is a cross-sectional view which corresponds to the cross-sectional view of FIG. 9 of automatic seat belt device to which the guide rail cover of a seventh embodiment is applied.

As shown in FIG. 8, over the lower surface of the guide rail 616, a guide groove 622 is formed in the longitudinal direction, so that into this guide groove 622, part of a slider 624 is inserted.

The guide groove 622 has its bottom's diameter enlarged, to contain a head 634 formed at the tip of the slider 624. The guide groove 622 has a tape guide groove 636 so formed as to be enlarged in width at the intermediate vertical portion of this groove, so that it can tightly receive a long-measure shaped flexible tape 638 in the longitudinal direction of the guide rail 616 in order to enable the movement of that tape in that direction.

Figure 10:
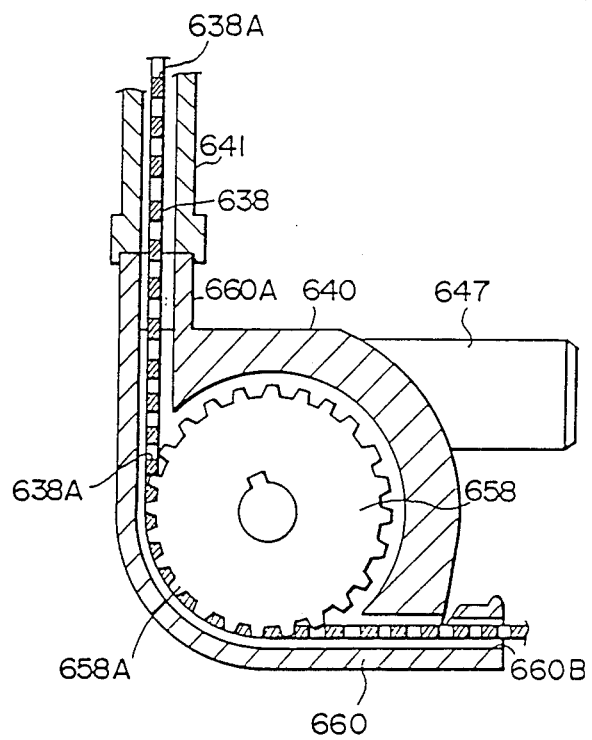
FIG. 10 is an expanded sectional view illustrating the portion for driving a flexible tape.

The flexible tape 638 is a thick-walled long measure made from a synthetic resin and has a plurality of openings 638A formed in the longitudinal direction (see FIG. 10). Through one of these openings, as shown in FIG. 8, the slider 624 extends at its intermediate portion, so that it can move together with the flexible tape 638.

As shown in FIG. 9, the flexible tape 638 is guided to a roller reel 640, passing through the tape guide groove in a tape track 641 connected to the guide rail 616.

As shown in FIG. 10, to the roller reel 640 is disposed a sprocket wheel 658, to which the driving force of a motor 647 is transferred via the worm and the worm gear which are not shown. The sprocket wheel 658 has its outerperipheral tooth 658A engaged with the opening 638A of the flexible tape 638 over substantially ¼ of its circumference, so that the flexible tape 638 is given both tensile strength and compressive strength.

Also, as shown in FIG. 9, to the slider 624, one end of an webbing 628 for an occupant is fixed via an anchor plate 626. The other end of the webbing 628 is rolled up in the shape of layer and contained in a roller 630 placed substantially at the intermediate portion of the vehicle. The roller 630 is supported to the vehicle body substantially in at its intermediate portion.

The roller 630 incorporates an inertia-lock mechanism which senses an emergency state of the vehicle with an acceleration sensor and instantaneously stops the draw-out of the webbing 628.

As shown in FIG. 8, the guide rail 616 is provided with guide rail cover strips 660 and 662 at its lower end near the entrance to the guide groove 622. Those stripps 660 and 662 are symmetrical with respect to the guide groove 622. The details of the strip 660 being illustrated in FIG. 11.

The strip 660 has a U-shaped cross section of a mounting base 664 made from a synthetic resin whose both feet sandwitches the lower end of the guude rail 616 and also does it have a pawl 666 formed at the tip inserted into a groove 616A formed at the lower end of the guide rail 616 so as to be mounted to the guide rail 616. The groove 616A is so formed as to continue in the longitudinal direction of the guide rail 616 (i.e., at a right angle with respect to the paper of FIG. 8), so that the mounting base 664 can be assembled by engaging it into this groove 616A and inserting it in the longitudinal direction of the guide rail 616.

Substantially at the intermediate portion of the mounting base 664, one end 668A of a lip 668 is integrally fixed. The lip 668, formed from a synthetic resin softer than that for the mounting base 664, has its tip 668B projecting in such a direction as to close the guide groove 622 and also so abutting against the tip 668B at the filler (lip) 668 of the strip 662 as to close the guide groove 622. However, since the lip 668 is formed from a resilient synthetic resin, it can easily be deformed so as to enable the passage of the slider 624 as shown in FIG. 8.

At the intermediate portion of the lip 668, an arm 668C projects, abutting against the back surface of the mounting base 664. Therefore, the rigidity of the lip 668 is improved at its intermediate portion.

Figure 11:
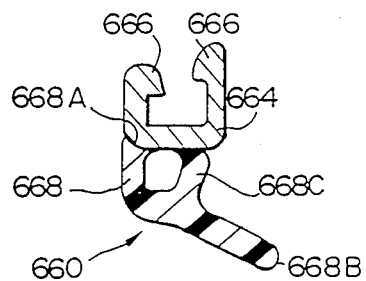
FIG. 11 is an expanded sectional view illustrating a strip used in the seventh embodiment.

Both the strips 660 and 662 thus formed are placed longitudinally at a right angle with respect to the paper surface of FIG. 11, so that they can be manufactured easily by extrusion.

The strips 660 and 662 can be easily assembled by letting the pawl 666 agree with the groove 616A and then inserting it along the longitudinal direction with respect to the guide rail 616.

The action of a seventh embodiment will be described hereinunder.

When some one has opened a door to get on a vehicle, the motor 647 drives the flexible tape 638 forward in the vehicle to put the webbing 628 into such a state as indicated by an imaginary line in FIG. 9, so that the occupant 643 can be seated on a seat 642.

When the occupant has been seated, the door is closed, for example, which in turn causes the motor 647 to reverse in rotation in order to move the webbing 628 backward in the vehicle, so that such a state as indicated by a solid line in FIG. 9 is provided. Therefore, the occupant can be automatically constrained by the webbing 628.

On the other hand, at the guide rail 616, the two tips 668B of the lip 668 abut against each other to close the guide groove 622, thus avoiding the entry of dust, etc. into the guide rail 622. Also, although the strips 660 and 662 are subjected to bending force at the bend 617, the arm 668C has a high rigidity to inhibit the tip 668B from developing fold, waviness, etc. at this portion, so that the guide groove 622 can surely be kept free of dust and also that a large resistance is not applied to the passage of the slider 624.

This embodiment would give the similar action and effect not only onto the bend 617 between the roof side member 614 and the center pillar 620 but also onto a bend 617A between the roof side member 614 and the front pillar 618.

Figure 12:
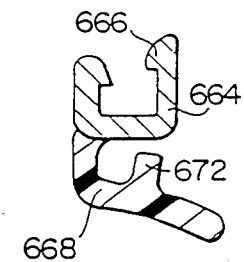
FIGS. 12 and 13 are expanded sectional views illustrating the strips related respectively to the eighth and nineth embodiments according to the present device.
Figure 13:
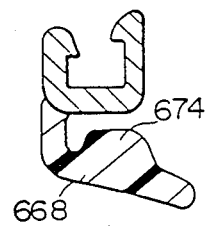
Figure 14:
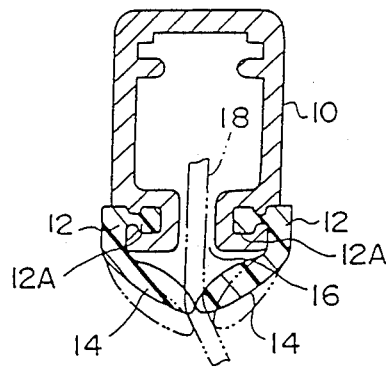
FIG. 14 is a longitudinal sectional view of guide rail illustrating a conventional guide rail cover.
Figure 15:
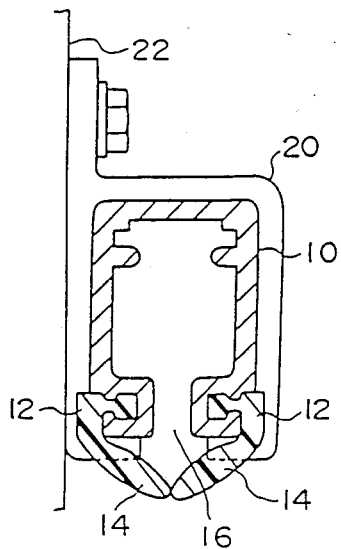
FIG. 15 is a longitudinal sectional view illustrating the guide rail of FIG. 14, as viewed when it is mounted on a vehicle.
Figure 16:
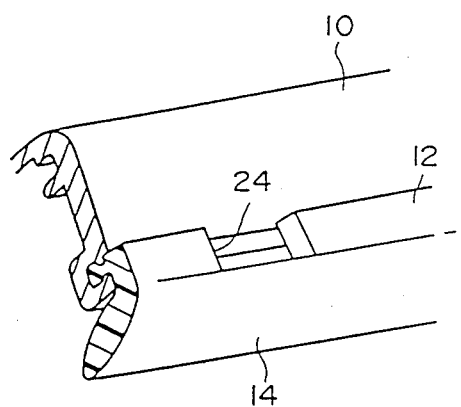
FIG. 16 is a fragmentary perspective view of FIG. 14.
Figure 17:
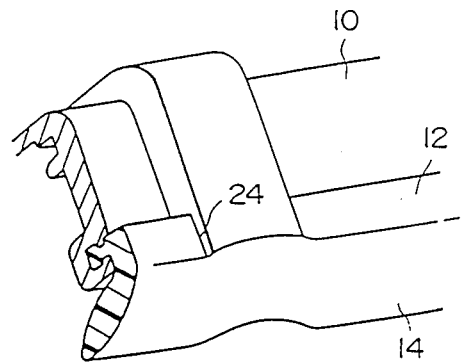
FIG. 17 is a perspective view illustrating the defect which occurred at the guide rail cover of FIG. 14.
Figure 18:
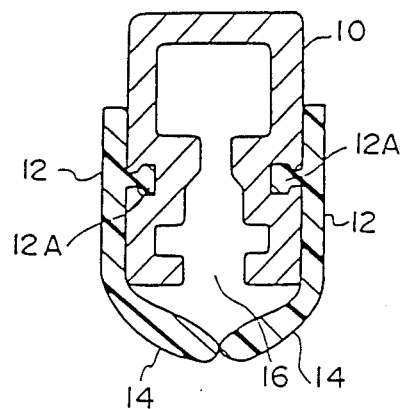
FIG. 18 is a longitudinal sectional view of guide rail illustrating another conventional guide rail cover.

FIGS. 12 and 13 respectively show eighth and nineth embodiments according to the present invention. In contrast to the preceding embodiments, these two provide such a state that arms 672 and 674 formed at the intermediate portion of the filler (lip) 668 and are not in contact with the mounting base 664. Moreover, the arm 674 has a large cross sectional area as compared with the arms 668C and 672, which in turn would provide the lip 668 with a rigidity even higher than any of the preceding embodiments.

As described so far, the seventh through nineth embodiments mentioned above provide an excellent effect of inhibiting the strip from bringing about fold or waviness to the guide rail bend because those embodiments feature such a guide rail cover that its one end is mounted to the guide rail and the other end abuts in such a direction as to close the opening through which the guide rail slider would pass.

What is claimed is:

1. A guide rail cover disposed along a guide rail having a guide groove for guiding a slider retained an end of a webbing for fastening an occupant of a vehicle in forward and backward directions of said vehicle, comprising:
   a base made of a rigid synthetic resin and disposed to the guide rail; and
   a filler made from a nonrigid synthetic resin and extending from said base in a direction for closing said guide groove.

2. A guide rail cover according to claim 1, further comprising a shoe made of said rigid synthetic resin and also extending from said base to slidably contact with said slider.

3. A guide rail cover according to claim 2, wherein said shoe comprises a portion arranged between said slider and said guide rail.

4. A guide rail cover according to claim 1, wherein said filler has a thick-walled portion formed at an intermediate portion in the extending direction thereof.

5. A guide rail cover according to claim 4, wherein said thick-walled portion comprises an extending portion extended towards said slider.

6. A guide rail cover according to claim 1, further comprising an abutting portion made of a rigid synthetic resin and connected to a tip portion of said filler for pressingly abutting against said slider.

7. A guide rail cover according to claim 6, wherein said abutting portion has substantially circular shape in cross section.

8. A guide rail cover according to claim 2, wherein said filler has a thick-walled portion formed at an intermediate portion in the extending direction thereof.

9. A guide rail cover according to claim 2, further comprising an abutting portion made of a rigid synthetic resin and connected to a tip portion of said filler for pressingly abutting against said slider.

10. A guide rail cover according to claim 8, further comprising an abutting portion made of a rigid synthetic resin and connected to a tip portion of said filler for pressingly abutting against said slider.

11. A guide rail cover according to claim 6, wherein said base, said filler, and said abutting portion are integrally formed.

12. A guide rail cover mounted to a guide rail having a guide groove for receiving a part of a slider and for guiding said slider secured one end of a webbing for fastening an occupant of a vehicle in forward and backward directions of said vehicle, comprising:

a base formed of a rigid synthetic resin mounted to said guide rail;

a filler made of a nonrigid synthetic resin softer than said rigid resin and extending from said base in a direction for closing said guide groove and for slidably contacting with said slider; and a shoe made of a rigid synthetic resin and continuously extending and from said base and for slidably contacting with said slider.

13. A guide rail cover according to claim 12, wherein said shoe comprises a portion arranged between said slider and said guide rail.

14. A guide rail cover according to claim 12, wherein said filler has a thick-walled portion formed at an intermediate portion in the extending direction thereof.

15. A guide rail cover according to claim 14, wherein said thick-walled portion comprises an extending portion extended towards said slider.

16. A guide rail cover according to claim 12, further comprising an abutting portion made of a rigid synthetic resin and connected to a tip portion of said filler for pressingly abutting against said slider.

17. A guide rail cover according to claim 16, wherein said abutting portion has substantially circular shape in cross section.

18. A guide rail cover according to claim 12, wherein said base, said filler, and said shoe are integrally formed.

19. A guide rail cover according to claim 16, wherein said base, said filler, said shoe, and said abutting portion are integrally formed.

* * * * *

UNITED STATES PATENT AND TRADEMARK OFFICE
CERTIFICATE OF CORRECTION

PATENT NO. : 4,840,401

DATED : June 20, 1989

INVENTOR(S) : YAMASHITA et al.

It is certified that error appears in the above-identified patent and that said Letters Patent is hereby corrected as shown below:

TITLE PAGE
IN THE FOREIGN APPLICATION PRIORITY DATA:

The Foreign Application Priority Data should also list:

--June 20, 1988 [JP] Japan 63-81368--

Signed and Sealed this

Twenty-fifth Day of August, 1992

Attest:

DOUGLAS B. COMER

Attesting Officer                Acting Commissioner of Patents and Trademarks